UNITED STATES PATENT OFFICE.

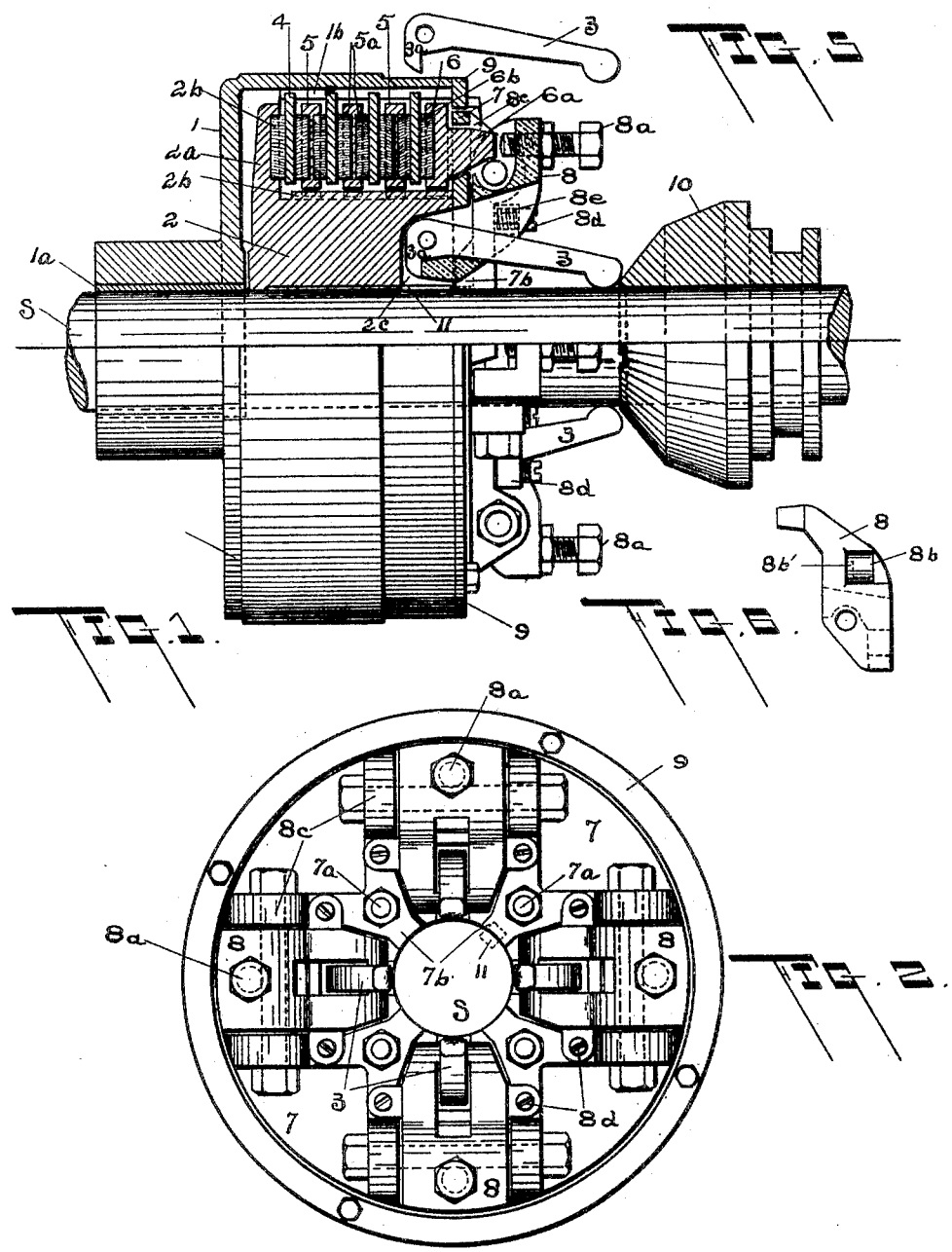

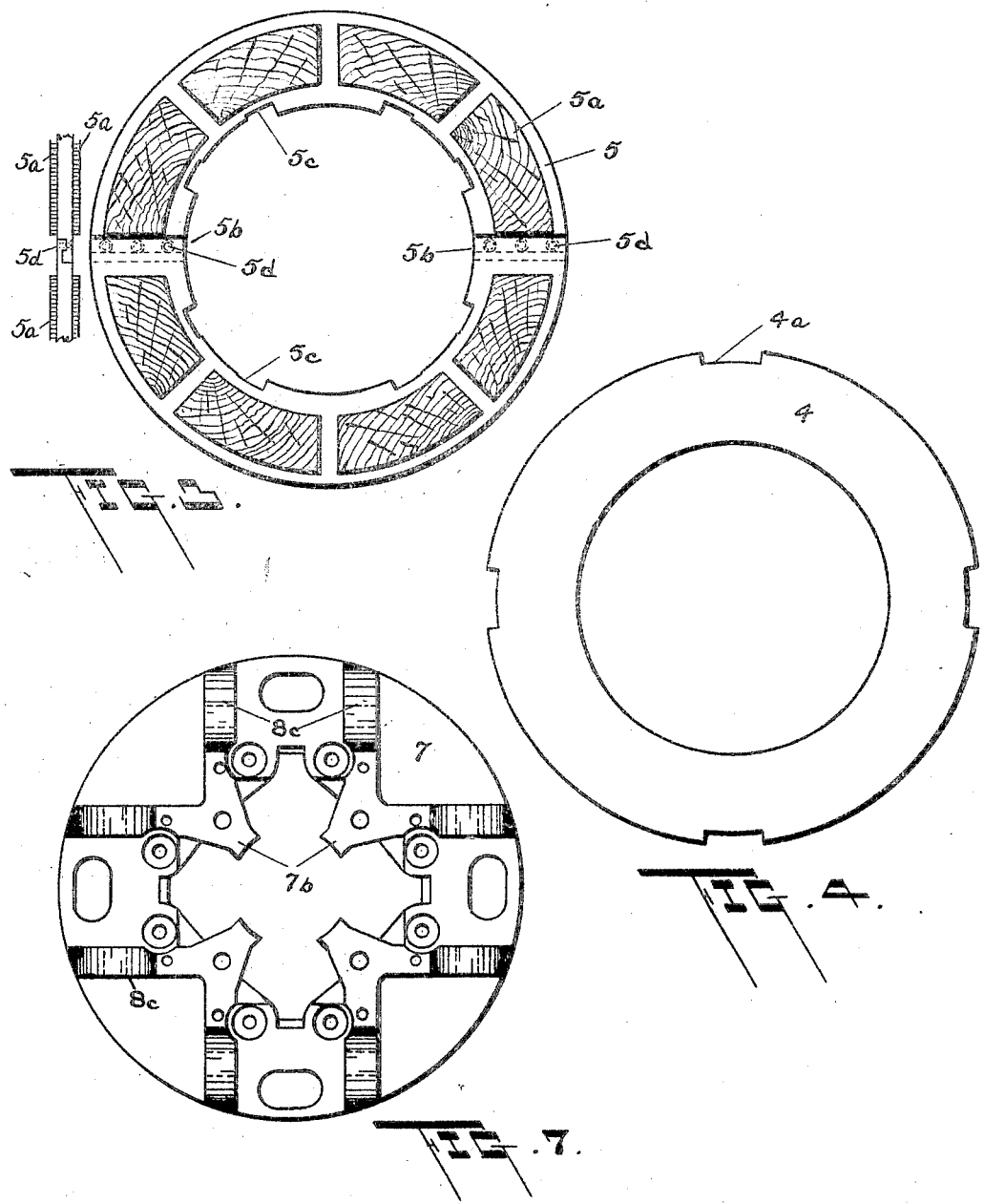

ALPHEUS ELTON HOLCOMB, OF BAY CITY, MICHIGAN.

FRICTION-CLUTCH.

No. 797,578.      Specification of Letters Patent.      Patented Aug. 22, 1905.

Application filed May 14, 1904. Serial No. 207,980.

*To all whom it may concern:*

Be it known that I, ALPHEUS ELTON HOLCOMB, a citizen of the United States, residing at Bay City, in the county of Bay and State of Michigan, have invented certain new and useful Improvements in Friction-Clutches; and I do hereby declare the following to be a full, clear, and exact description of the invention, such as will enable others skilled in the art to which it appertains to make and use the same.

This invention is a friction-clutch; and the improvements consist in the parts, their combination, and the equivalents thereof, as will be fully set forth in this specification.

My invention is illustrated in the accompanying drawings, in which—

Figure 1 is a part-sectional elevation of the clutch. Fig. 2 is an end view. Fig. 3 is a face view and partial edge view of one of the driving transmission-rings. Fig. 4 is a face view of a driven transmission-ring. Fig. 5 is a side view of the finger or lever that operates the toggle. Fig. 6 is a side view of the toggle. Fig. 7 is a face view of the toggle-bracket plate.

As is clearly shown in the drawings, the device consists in a suitable cylindrical shell or casing 1, revolubly mounted on the shaft S and provided with an antifriction-bearing $1^a$. To this casing may be secured a brake-band, a gear, a pulley, or any other device or combination of devices to be actuated by the clutch when in gear. Fixed to the inner wall of the casing and extending parallel to the axis of the shaft is a plurality of keys $1^b$, that project a short distance radially in from the circumference of the casing. On these keys is slidably mounted a series of annular driving transmission-rings 4, of steel, iron, or other suitable material, having slots $4^a$ in their peripheries to engage the keys $1^b$.

Keyed to the shaft and inclosed within the casing 1 is a hub 2, having a projecting flange $2^a$ at one end and having on its periphery a plurality of fixed keys $2^b$, arranged parallel with the shaft and projecting radially out from the hub. Upon these keys are slid annular driving transmission-rings 5, the details of which will be described later. The hub 2 has on one end a series of radially-disposed recesses $2^c$, in which are pivotally mounted the levers or fingers 3, that actuate the gripping mechanism of the clutch. Each finger 3 has an inwardly-projecting hook or lug $3^a$, to which a slight forward or backward movement is imparted as the free end of the finger 3 is forced out from or toward the axis of the shaft. This movement is accomplished by means of the sliding engaging cone 10, as is usual in clutches of this type.

Secured by means of bolts $7^a$ or otherwise fastened to the face of the hub 2 is a plate 7, which I term the "bracket-plate." It not only carries the brackets $8^c$, in which are mounted the toggle-arms 8, but also forms a closure or cap for the end of the clutch and prevents entrance of chips or dirt liable to injure the friction-faces of the transmission-rings. The lower end of a lever 8 is contacted by the hook of finger 3 and forced outward. The upper end of the lever 8 carries an adjusting-screw $8^a$, the inner end of which contacts with a projection $6^a$, carried by the outer driving transmission-ring 6. The inner face of the driving transmission-ring 6 is lined with wooden blocks $6^b$, the grain of which extends parallel with the axis of the shaft. Similarly each driving transmission-ring 5 is provided on each side with wooden blocks $5^a$, and the inner face of flange $2^a$ is likewise provided with blocks $2^b$.

As is clearly shown in Fig. 3, each driving transmission-ring is made in two parts secured together by mortised joints $5^b$, held in place by screws $5^d$. The forces in the rings act circumferentially and are resisted by the faces of the mortises. This device permits each driving-ring to be removed from the shaft without removing the clutch, and consequently the wooden wearing-faces can be easily and quickly removed and replaced. The rings 5 are provided on their inner peripheries with slots $5^c$, registering with the keys $2^b$ of the hub 2.

It will be noted that the plate 7 when bolted to the hub 2 by means of the bolts $7^a$ is practically integral with it, and hence the reactions of finger 3 and lever 8, carried by the bracket-plate 7, are localized in the hub 2 and plate 7, thereby relieving the shell 1 of all endwise thrust due to pressure of the lever set-screw $8^a$ upon the driving transmission-ring 6. The combination of the finger 3 with the lever, as illustrated in Fig. 1, produces a powerful leverage that results in heavy thrust of the set-screw against the driving transmission-rings and greatly increases the driving power of the clutch.

By using inserted wooden friction-blocks on both sides of each transmission-ring 5 and alternating the rings 5 with plain driven transmission-rings 4, preferably of steel or iron, it is only necessary to remove half of the clutch-rings in order to renew all the wooden blocks.

It is usual in devices of this class to key the hub of the clutch to the shaft in order to lock the hub against rotation and also to insert a set-screw in the hub to take the end thrust, and thus prevent the hub sliding endwise on the shaft. It is found in practice that the set-screw burs out the metal of the shaft, and thereby makes it difficult to remove the hub by sliding it back on the shaft. I avoid this difficulty by not using a set-screw, as, there being no end thrust on the shaft, no set-screw is needed to take end thrust. I prevent the key 11 from working loose by forming the toggle-bracket plate 7 with inwardly-projecting wings $7^b$, one of which is so arranged in assembling the clutch as to project down in front of the key 11, and thereby prevent longitudinal movement of the key along the shaft.

To prevent a too great endwise movement of the casing 1 relatively to the hub 2 and to prevent the annular driving and driven transmission-rings 4 and 5 sliding off the fixed keys $1^b$ and $2^b$, a follower-ring 9 is bolted to the front face of the casing, as shown in Fig. 2.

To return the toggle 8 to its normal position after having been forced out by the finger 3, as previously described, I provide a lug $8^b$ at each side of the toggle 8. Through a hole $8^{b'}$ in the lug $8^b$ passes a screw $8^d$, which is threaded into the toggle-bracket plate 7. Between the face of the lug and the head of the screw is inserted a coil-spring $8^e$. This spring is compressed by the outward movement of toggle 8, and as soon as the pressure exerted by the finger 3 on toggle 8 is released the spring $8^e$ forces the toggle back into its normal position, thus relieving the pressure on the driving and driven transmission-rings and throwing the clutch out of gear.

What I claim as my invention, and desire to secure by Letters Patent, is as follows:

1. The combination of an inclosing casing having keys on its inner periphery; of annular metal driven rings slidably mounted on said keys; of a hub having a radially-projecting flange and axially-arranged keys; annular driving-rings faced with wooden blocks and slidably mounted on said keys and alternating with driven rings; hooked fingers pivotally mounted in said hub; levers carried by said hub and having their inner ends engaging the hooks of said fingers and each carrying a set-screw at its outer end adapted to force said rings together and against said flange; together with a sliding cone engaging the free ends of said fingers; substantially as described.

2. The combination with the shaft, of an inclosing casing; transmission-rings carried thereby; a hub carrying transmission-rings; a key securing the hub to the shaft; a bracket-plate adapted to be secured to the hub of the clutch and carrying devices for actuating the transmission-rings of the clutch; said bracket-plate having inwardly-projecting wings adapted to engage the key of said hub.

3. The combination of an inclosing casing having keys on its inner periphery; of annular metal driven rings slidably mounted on said keys; of a hub having a radially-projecting flange and axially-arranged keys; annular driving-rings faced with wooden blocks and slidably mounted on said keys and alternating with said driven rings; hooked fingers pivotally mounted in said hub; means carried by said hub and actuated by said fingers for forcing said rings axially against said radial flange; together with a sliding cone engaging the free ends of said fingers.

In testimony whereof I affix my signature in presence of two witnesses.

ALPHEUS ELTON HOLCOMB.

Witnesses:
 JOHN K. LAW,
 A. A. EASTERLY.